(12) United States Patent
Beach et al.

(10) Patent No.: US 11,795,768 B2
(45) Date of Patent: Oct. 24, 2023

(54) TORQUE TRANSFER AND CONTROL APPARATUS FOR A DRILLING TOOL

(71) Applicant: REFLEX INSTRUMENTS ASIA PACIFIC PTY LTD, Balcatta (AU)

(72) Inventors: Andrew Beach, Balcatta (AU); Amir Mokaramian, Balcatta (AU)

(73) Assignee: REFLEX INSTRUMENTS ASIA PACIFIC PTY LTD, Balcatta (AU)

( * ) Notice: Subject to any disclaimer, the term of this patent is extended or adjusted under 35 U.S.C. 154(b) by 71 days.

(21) Appl. No.: 17/600,698

(22) PCT Filed: Apr. 3, 2020

(86) PCT No.: PCT/AU2020/050343
§ 371 (c)(1),
(2) Date: Oct. 1, 2021

(87) PCT Pub. No.: WO2020/198812
PCT Pub. Date: Oct. 8, 2020

(65) Prior Publication Data
US 2022/0170328 A1 Jun. 2, 2022

(30) Foreign Application Priority Data
Apr. 4, 2019 (AU) .................................. 2019901165

(51) Int. Cl.
*E21B 17/043* (2006.01)
*E21B 17/07* (2006.01)
(Continued)

(52) U.S. Cl.
CPC ........... *E21B 17/043* (2013.01); *E21B 17/076* (2013.01); *F16D 3/10* (2013.01); *F16D 7/025* (2013.01); *F16D 7/10* (2013.01)

(58) Field of Classification Search
CPC ........ E21B 17/05; E21B 17/043; F16D 7/025; F16D 7/10; F16D 3/10
See application file for complete search history.

(56) References Cited

U.S. PATENT DOCUMENTS 1,896,703 A * 2/1933 Dean ....................... E21B 10/02
175/249
5,947,214 A * 9/1999 Tibbitts ................. E21B 17/076
175/292

(Continued)

*Primary Examiner* — D. Andrews
(74) *Attorney, Agent, or Firm* — Stites & Harbison, PLLC; Terry L. Wright

(57) ABSTRACT

There is disclosed a torque transfer apparatus for a mineral drilling tool used in a downhole assembly of a drill string. The drilling tool has a downhole drill bit and one or more uphole drill bits spaced apart from the downhole drill bit, with the torque transfer apparatus being located between them. The apparatus has an axial bore therethrough for fluid flow and comprises first and second members being rotatably joined to each other. The apparatus rotationally couples and transfers torque between the first and second members when a torque difference between torque on the downhole drill bit and torque on the uphole drill bit is below a threshold torque value. The apparatus disengages the rotational coupling while the torque difference exceeds the threshold torque value. The flow rate of drilling fluid flowing through the axial bore is altered when the apparatus engages and disengages the coupling.

18 Claims, 12 Drawing Sheets

(51) Int. Cl.
*F16D 3/10* (2006.01)
*F16D 7/02* (2006.01)
*F16D 7/10* (2006.01)

(56) References Cited

U.S. PATENT DOCUMENTS 7,316,277 B2 * 1/2008 Jeffryes .................. E21B 10/26
  175/406
9,453,374 B2 * 9/2016 Sullivan .................. E21B 37/00

* cited by examiner

TORQUE TRANSFER AND CONTROL APPARATUS FOR A DRILLING TOOL

TECHNICAL FIELD

The present disclosure relates to a torque transfer and control apparatus for a drilling tool.

More particularly, the present disclosure relates to a torque transfer and control apparatus for a drilling tool for use in the mineral drilling industry wherein the drilling tool has a first/downhole cutting interface and an axially spaced apart second/uphole cutting interface.

BACKGROUND ART

In some mineral drilling systems the borehole being drilled displays a step change in its diameter, wherein a first drill bit at a downhole end of the drilling tool drills a "pilot" hole having a first diameter and which hole is subsequently enlarged to a second diameter by a second drill bit or reamer pads located uphole of and axially spaced from the downhole drill bit.

Such dual cutting interface systems are sometimes found in retractable drill bit drilling systems or in retractable core barrel drilling systems. Examples of these systems are known from U.S. Pat. Nos. 3,955,633, 4,497,382 and WO 2019/068145. Because these drilling systems have two spaced apart cutting interfaces, there is a need to ensure an optimal force distribution across both cutting interfaces so that neither cutting interface carries more force than the other, i.e. the weight on bit force applied by the drill rig should be optimally shared between the two cutting interfaces so that they experience optimal axial torque loading. The force distribution is often adjusted during a drilling operation based on the condition of the rock formation at each cutting interface so that the optimum drilling condition is achieved.

This force distribution across the cutting interface is particularly important in relation to the downhole cutting interface to ensure that the force on the downhole drill bit (pilot bit) does not exceed a safe design limit and to prevent excessive force being carried by the drilling tool. While the uphole drill bit may be supported by the drill rods, the downhole drill bit is merely supported by the drilling tool. Due to the need to fit through the drill rods and still contain internal equipment, the sidewall of the drilling tool is often thinner than that of the drill rods and is not structurally very strong.

Ground bedrock comprises both competent rock formations and incompetent rock formations. Competent rock formations are those in which an unsupported opening can be made because they exhibit a degree of resistance to deformation or flow. In contrast, incompetent rock formations are often soft or fragmented and do not permit a borehole or cavity to be maintained unless it is artificially supported, e.g. by casing or cementing.

Drilling through only one or the other of these rock formations with a dual cutting to interface drilling system generally requires a predicable weight on bit force to be applied. This system should be able maintain the optimal force distribution across both the downhole and uphole drill bits. However, when the drilling tool traverses a boundary between competent and incompetent rock formations or a boundary between different types of competent rock formations, the drilling conditions change rapidly because more force is required to drill through competent rock formations than is required to drill through incompetent rock formations. Traversing such a boundary layer requires a change to the force distribution between the uphole and downhole drill bits.

While the drilling tool traverses such a boundary layer, the downhole drill bit may encounter an incompetent rock formation while the uphole drill bit is still drilling through a competent rock formation. Such a situation is not particularly detrimental to the drilling tool as the uphole drill bits are normally adequately supported by the drill string. However, the converse situation can be very detrimental to the drilling tool, i.e. when the downhole drill bit encounters a competent rock formation while the uphole drill bit is still drilling through or about to drill through an incompetent rock formation. In such situations very little weight on bit force will be carried by the uphole drill bit and most of the force is transferred directly to the downhole drill bit—this can lead to damage to the thin walled drilling tool including galling and belling of the threads of the various components forming the drilling tool.

The above problems are exacerbated in such mineral drilling systems because these are typically operated at high speeds (above 400 rpm) using diamond matrix drill bits. Operating these drill bits in adverse conditions as described above, can lead to polishing of the drill bits causing them to become blunt if insufficient force is applied, or it can lead to catastrophic failure of the drill bit if excessive force is applied.

The above references to the background art do not constitute an admission that the art forms a part of the common general knowledge of a person of ordinary skill in the art. The above references are not intended to limit the application of the apparatus and method as disclosed herein.

SUMMARY OF THE DISCLOSURE

According to a first aspect of the disclosure, there is provided a drilling tool for use in a downhole assembly of a drill string used in the mineral drilling industry, the drilling tool comprising:

a downhole drill bit provided at its downhole end;
one or more uphole drill bits located uphole of and spaced apart from the downhole drill bit; and
a torque transfer apparatus located between the downhole drill bit and the uphole drill bits, wherein the torque transfer apparatus comprises:
 a body having an axial bore therethrough for fluid flow, the body comprising a first member and a second member being rotatably joined relative to each other, wherein one of the first member and the second member is operatively associated with the downhole drill bit and the other of the first member and the second member is operatively associated with the one or more uphole drill bits;
 a torque limiting device interconnecting the first and second members, wherein the torque limiting device is configured to transfer torque between the first and second members by rotationally coupling the first and second members together when a torque difference between torque on the first member and torque on the second member is below a threshold torque value, and wherein the torque limiting device is configured to at least partially or temporarily disengage the coupling between the first and second members while the torque difference exceeds the threshold torque value; and
 a fluid flow modifier being configured to alter a flow rate of drilling fluid flowing through the axial bore when the torque limiting device engages and disengages the coupling between the first and second members.

The body may have a transverse wall traversing the axial bore with one or more fluid ports extending through the transverse wall. The fluid flow modifier may be configured to selectively open or close the fluid ports. The fluid ports may be open while the torque limiting device engages the coupling between the first and second members. One or more of the fluid ports may be selectively able to be at least partially or fully closed while the torque limiting device disengages the coupling between the first and second members.

The fluid flow modifier may be configured to cause an increased or pulsing pressure change in the drilling fluid flowing within the axial bore.

The torque limiting device may include a friction washer interposed between the first member and the second member. The friction washer may be non-rotatable relative to the first member. In one embodiment the friction washer includes at least one key projecting radially outwardly therefrom, each key being receivable in a corresponding locating keyway provided on the first member.

In one embodiment the threshold torque value may be adjustable by varying the friction between the friction washer and the second member. The first member may be axially adjustable relative to the second member thereby being configured to selectively increase or decrease a pressure exerted on the friction washer and thereby alter the friction between the friction washer and the second member.

The torque limiting device may include the first member having a first surface defining at least one recess therein and the second member having at least one movable engagement member, each engagement member being biased by a resilient device to partially engage into the recess on the first member to cause the first and second members to rotate together, and wherein the engagement member is configured to disengage from the recess when the torque difference exceeds the threshold torque value.

In one embodiment the threshold torque value may be adjustable by varying a biasing force exerted by the resilient device. In another embodiment the threshold torque value may be adjustable by varying a depth to which each engagement member extends into its recess.

The fluid flow modifier may be configured to reduce the flow rate of fluid flowing through the axial bore when the torque limiting device disengages the coupling between the first and second members.

The uphole drill bits may include one or more reamers, cutters or hole openers.

The downhole drill bit may be mounted on a core barrel assembly carried by the drilling tool. The torque transfer apparatus may include one or more outlet ports leading from the axial bore, with each outlet port being configured to open into an annulus between an outer tube and an inner core tube of the core barrel assembly.

The drilling tool may further include a plurality of coupling members provided on the drilling tool, the coupling members being able to extend or retract in a radial direction relative to the drilling tool to respectively permit coupling or decoupling of the drilling tool to a drive sub mounted on a drill string, and wherein the uphole drill bits are mounted on the coupling members. The drive sub may have a castellated downhole edge comprising a plurality of slots into which the coupling members are configured to engage, and wherein the uphole drill bits extend axially beyond a downhole end of the drive sub.

According to a second aspect of the disclosure, there is provided a method of operating a drilling tool that has a downhole drill bit and an axially spaced apart uphole drill bit, the method comprising the steps of:

locating a torque transfer apparatus in the drilling tool between the downhole drill bit and the uphole drill bit, wherein the torque transfer apparatus rotationally couples the downhole drill bit and the uphole drill bit;

operating the drilling tool in a borehole to rotate the drilling tool so that, while a torque difference between torque on the downhole drill bit and torque on the uphole drill bit is below a threshold torque value, torque applied to the drilling tool is applied to the downhole drill bit and the uphole drill bit;

having drilling fluid flow at a selected flow rate through the torque transfer apparatus;

allowing the torque transfer apparatus to at least partially or temporarily disengage the coupling between the downhole drill bit and the uphole drill bit while the torque difference exceeds the threshold torque value;

causing the drilling fluid to flow at an altered flow rate through the torque transfer apparatus when the torque transfer apparatus disengages the coupling between the downhole drill bit and the uphole drill bit; and if the torque difference subsequently drops below the threshold torque value, automatically re-engaging the rotational coupling between the downhole drill bit and the uphole drill bit and causing the drilling fluid to flow at the selected flow rate.

The method may include the use of a torque transfer apparatus as defined in the first aspect of the disclosure.

According to a third aspect of the disclosure, there is provided a torque transfer apparatus for a drill string or a drilling tool located in a borehole, the apparatus comprising:

a body having an axial bore therethrough for fluid flow, the body comprising a first member and a second member being rotatably joined relative to each other;

a torque limiting device interconnecting the first and second members, wherein the torque limiting device is configured to transfer torque between the first and second members by rotationally coupling the first and second members together when a torque difference between torque on the first member and torque on the second member is below a threshold torque value, and wherein the torque limiting device is configured to at least partially or temporarily disengage the coupling between the first and second members while the torque difference exceeds the threshold torque value; and a fluid pressure modifier being configured to alter a flow rate of fluid flowing through the axial bore when the torque limiting device engages and disengages the coupling between the first and second members.

BRIEF DESCRIPTION OF DRAWINGS

The above and other features will become more apparent from the following description with reference to the accompanying schematic drawings. In the drawings, which are given for purpose of illustration only and are not intended to be in any way limiting.

DETAILED DESCRIPTION OF THE DRAWINGS

Embodiments of the present disclosure are described in the context of downhole drilling in the mineral drilling industry and, in particular, to a borehole that is drilled at two discrete spaced apart cutting interfaces so that the borehole displays a step change in its diameter.

Figure 1:
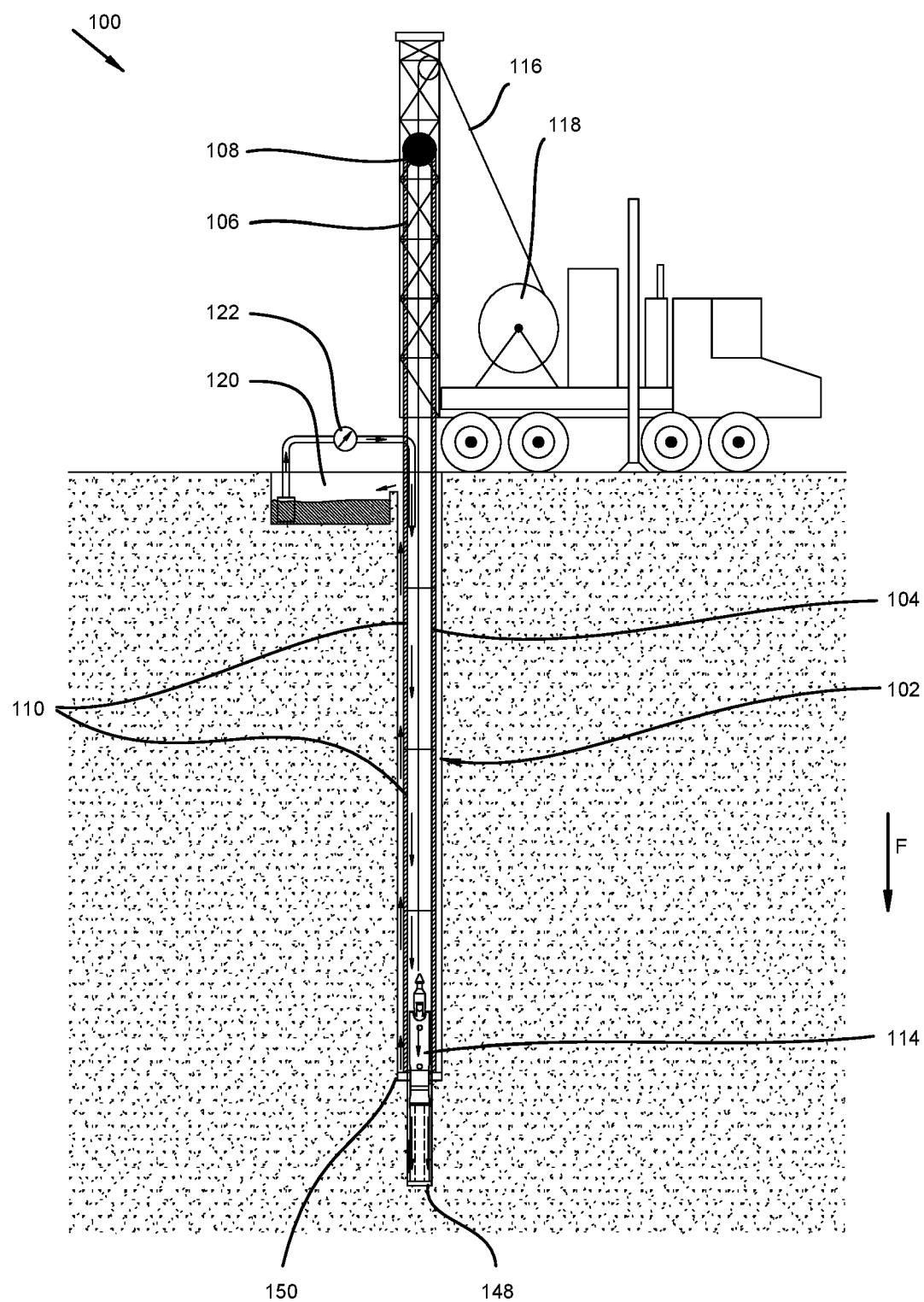
FIG. 1 is a schematic side representation of a downhole drilling arrangement which constitutes a possible operating environment for embodiments of the torque transfer and control apparatus.

One such downhole drilling arrangement is shown in FIG. 1, which shows a drill rig 100 in the process of drilling a borehole 102 using a drill string 104. The drill rig 100 has a mast 106 supporting a rotation head 108 with an up-hole end of the drill string 104 being attached to the rotation head 108. During operation the rotation head 108 transfers torque to (i.e. rotates) the drill string 104.

Figure 2:
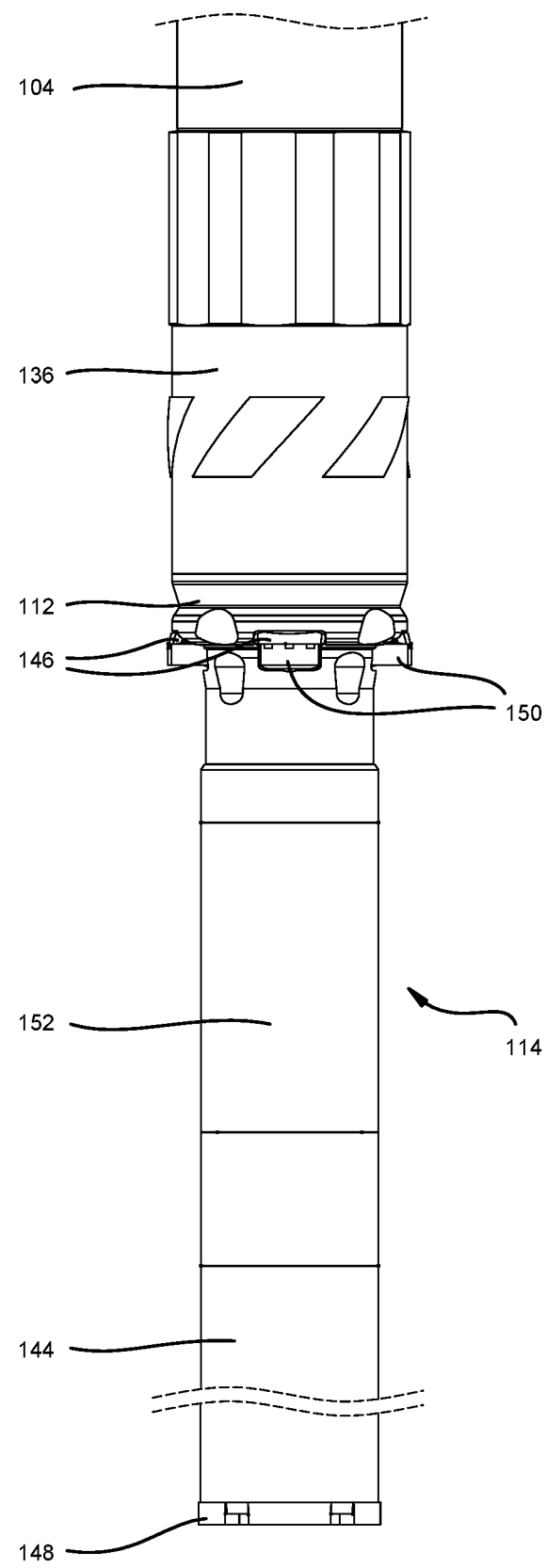
FIG. 2 is an enlarged side view of the downhole end of a drill string shown in FIG. 1, showing the drill string provided with a drive sub engaging a drilling tool in which the torque transfer and control apparatus is installed.

The drill string 104 is composed of a number of end-to-end connected drill rods 110 leading from the rotation head 108 to a downhole drive sub 112 (see FIG. 2). A drilling tool 114 is configured to be lowered through the drill string 104 to engage the drive sub 112 so that torque can be transferred from the drill string 104 via the drive sub 112 to the drilling tool 114. When the drilling tool 114 is to be retrieved from the drive sub 112, an overshot is lowered on a wireline 116 to latch onto the drilling tool 114, whereafter the wireline 116 is reeled in by winch 118 to pull the drilling tool 114 to the drill rig 100.

During a drilling operation, a drilling fluid (i.e. mud) is pumped into the borehole 102 through the drill string 104. The drilling fluid performs many functions including lubricating a drill bit coupled to the drill string 104, flushing drill cuttings from the borehole 102 being drilled, and assisting operation of the drilling tool 114 by action of the pressure of the drilling fluid. The drilling fluid is normally pumped from an associated mud pit 120 located near to the drill rig 100. A return flow of the drilling fluid from the borehole 102 is directed back into the mud pit 120. This facilitates recirculation of the drilling fluid from the mud pit 120, down internally through the drill string 104 to the drill bit 148 where the drilling fluid exits into the toe of the borehole 102, whereafter the drilling fluid flows back up the borehole 102 externally of the drill string 104, and back into the mud pit 120 where it can be recycled and redirected back down the borehole 102.

The flow rate of drilling fluid being pumped into the borehole 102 and the downhole pressure of the drilling fluid are monitored by a driller, who is located at the uphole ground surface, using various gauges and sensors 122. While drilling, the driller observes these fluid flow characteristics to judge the downhole conditions and events and, when necessary, can adjust the amount of torque, weight on bit, or other drilling parameters being delivered by the rotation head 108 to the drill string 104 and/or drilling tool 114.

FIG. 2 shows an enlarged view of the bottom portion of the drill string 104 shown in FIG. 1. The drilling tool 114 is releasably attached to the drive sub 112 which is joined to the drill string 104 so that torque imparted to the drill string 104 is transferred by the drive sub 112 to the drilling tool 114.

Figure 3:
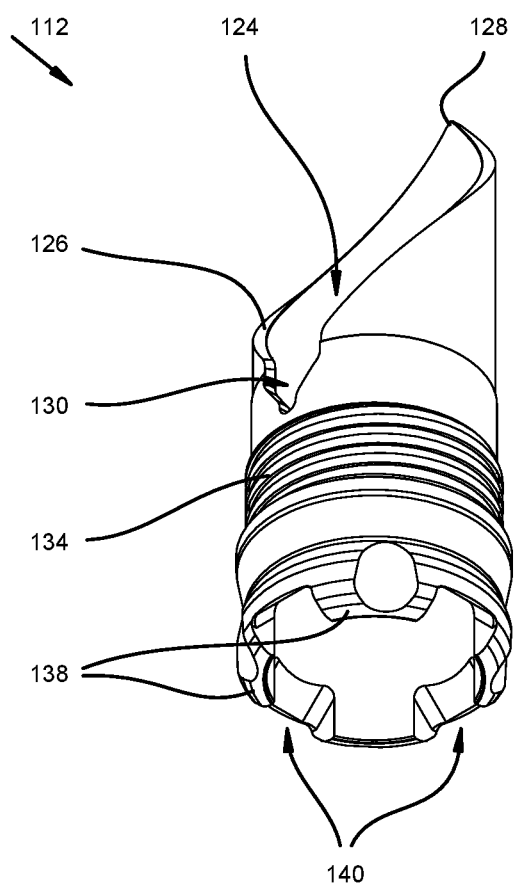
FIG. 3 is a perspective view of the drive sub shown in FIG. 2 seen from its downhole end.

The drive sub 112, shown more clearly in FIG. 3, is a substantially tubular body defining a central passage 124 through which the drilling tool 114 is able to extend. The drive sub 112 has a curved uphole guide edge 126 that leads from an uphole peak 128 to a socket 130, wherein the guide edge 126 is configured to rotationally align the drilling tool 114 with the drive sub 112 as the drilling tool 114 passes through the passage 124. In this regard a key 132 (shown in FIG. 4) protrudes from the drilling tool 114 so that the key 132 can abut and run along the guide edge 126 until it becomes seated in the socket 130. The drive sub 112 is formed with an outer screw thread 134 for connecting the drive sub 112 to other parts of the drilling assembly, e.g. to the drill string 104 or to a reamer sub 136 (see FIG. 2).

The drive sub 112 has a castellated downhole edge in which there are provided a plurality of equally spaced lugs 138 separated from each other by intervening slots 140. The exemplary embodiment of the drive sub 112 is shown having four lugs 138 being orthogonally spaced from each other by four slots 140.

Figure 4:
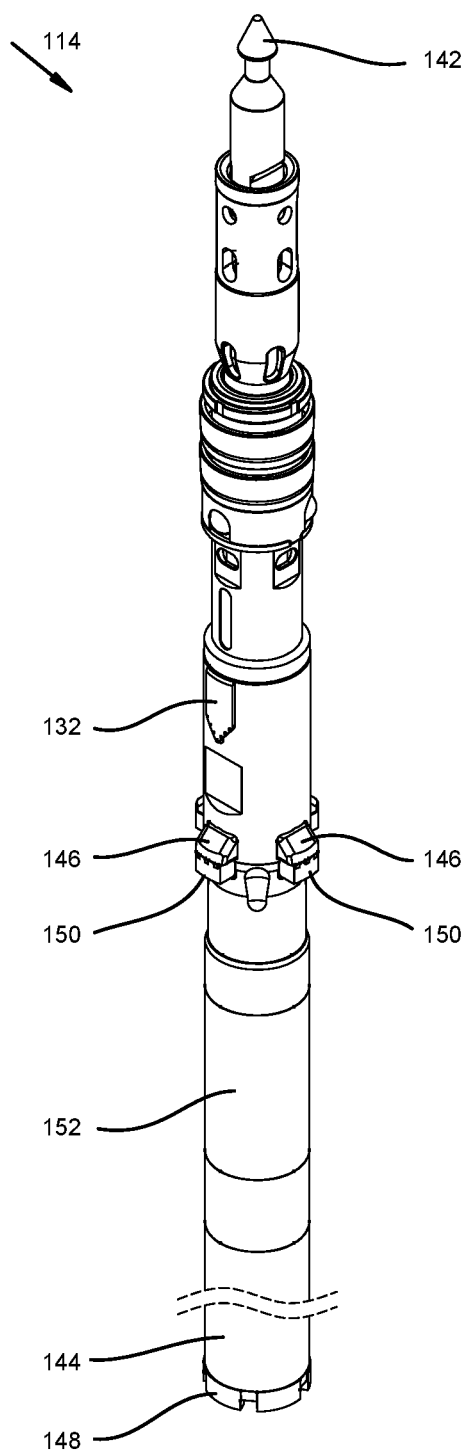
FIG. 4 is a perspective view of the drilling tool shown in FIG. 2 seen from its uphole end.

It will be appreciated by those skilled in the art that the drilling tool 114, shown in FIG. 4, can comprise several different parts arranged to perform different drilling functions. These parts are provided as respective subs that can be threadingly joined to each other end-on-end. For the purposes of this description the individual tool parts and their working will not be described in detail.

The drilling tool 114 has a spear point 142 at its uphole end for engaging the overshot, while the opposed downhole end of the drilling tool 114 carries a core barrel assembly 144 arranged to collect a core sample from the borehole 102. A number of coupling members 146 are provided approximately midway along the length of the drilling tool 114, which coupling members 146 are able to extend or retract in a radial direction relative to the drilling tool 114. The coupling members 146 are able to be housed fully within the drilling tool 114 to permit travel thereof through the drill string 104. As shown in FIG. 2, when the drilling tool 114 engages the drive sub 112, the coupling members 146 are moved to project radially outwardly from the drilling tool 114 to engage into the slots 140 and couple the drilling tool 114 to the drive sub 112. Conversely, the coupling members 146 are able to be again retracted from the slots 140 and housed fully within the drilling tool 114 to decouple it from the drive sub 112 when withdrawing the drilling tool 114 from the drill string 104. When coupled, an uphole part of the drilling tool 114 uphole of the coupling members 146 remains within the drill string 104 while a downhole part of the drilling tool 114 downhole of the coupling members 146 projects axially beyond the drill string 104 (as shown in FIGS. 1 and 2).

The drilling tool 114 has a downhole drill bit 148 at its terminal downhole end that, in operation, is configured to form a first cutting interface. Typically, the downhole drill bit 148 is carried on the core barrel assembly 144. The downhole drill bit 148 can be any one of the following types of commonly known drill bits, such as coring or non-coring diamond impregnated bits, coring or non-coring surface set diamond bits, polycrystalline diamond compact (PDC) bits, tungsten pins, or coring or non-coring hard faced metal roller cones, amongst others.

The drilling tool 114 further has one or more uphole drill bits 150. In the exemplary embodiment, the uphole drill bits 150 are carried on each of the coupling members 146. When the coupling members 146 are engaged within the slots 140 of the drive sub 112, the drill bits 150 project axially downhole beyond the downhole end of the drive sub 112. In this manner the uphole drill bits 150 are configured to form a second cutting interface, wherein the second cutting interface is spaced apart from and located uphole of the first cutting interface.

In other embodiments the uphole drill bits 150 may be borehole reamers, cutters, hole openers or any other drilling/cutting unit capable of enlarging the borehole 102. It is also envisaged that such a drilling/cutting unit can include a single reamer, cutter, hole opener or drill bit. The uphole drill bits 150 can be any one of the following types of commonly known drill bits such as diamond impregnated bits or reamers, surface set diamond bits or reamers, polycrystalline diamond compact (PDC) bits, or tungsten pins, amongst others.

At some position along the length of the drilling tool 114 between the uphole drill bits 150 and the downhole drill bit 148, there is provided a torque transfer apparatus 152 that is arranged to control the transfer of torque between the first cutting interface, i.e. being drilled by the downhole drill bit 148, and the second cutting interface, i.e. being drilled by the uphole drill bits 150. The torque transfer apparatus 152 is also configured to provide a signal to a driller when the torque transfer status is changed.

Figure 5:
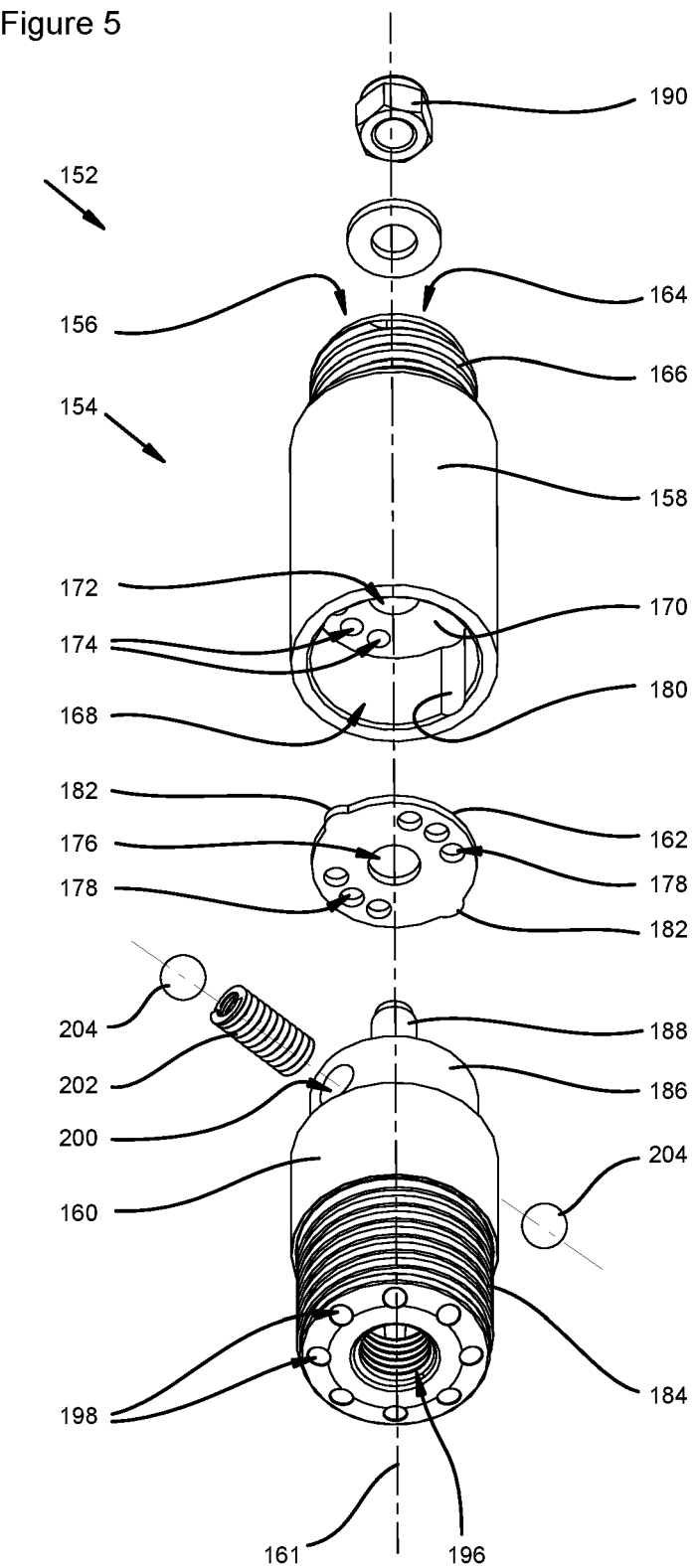
FIG. 5 is an exploded perspective view of the torque transfer and control apparatus seen from its downhole end.
Figure 6:
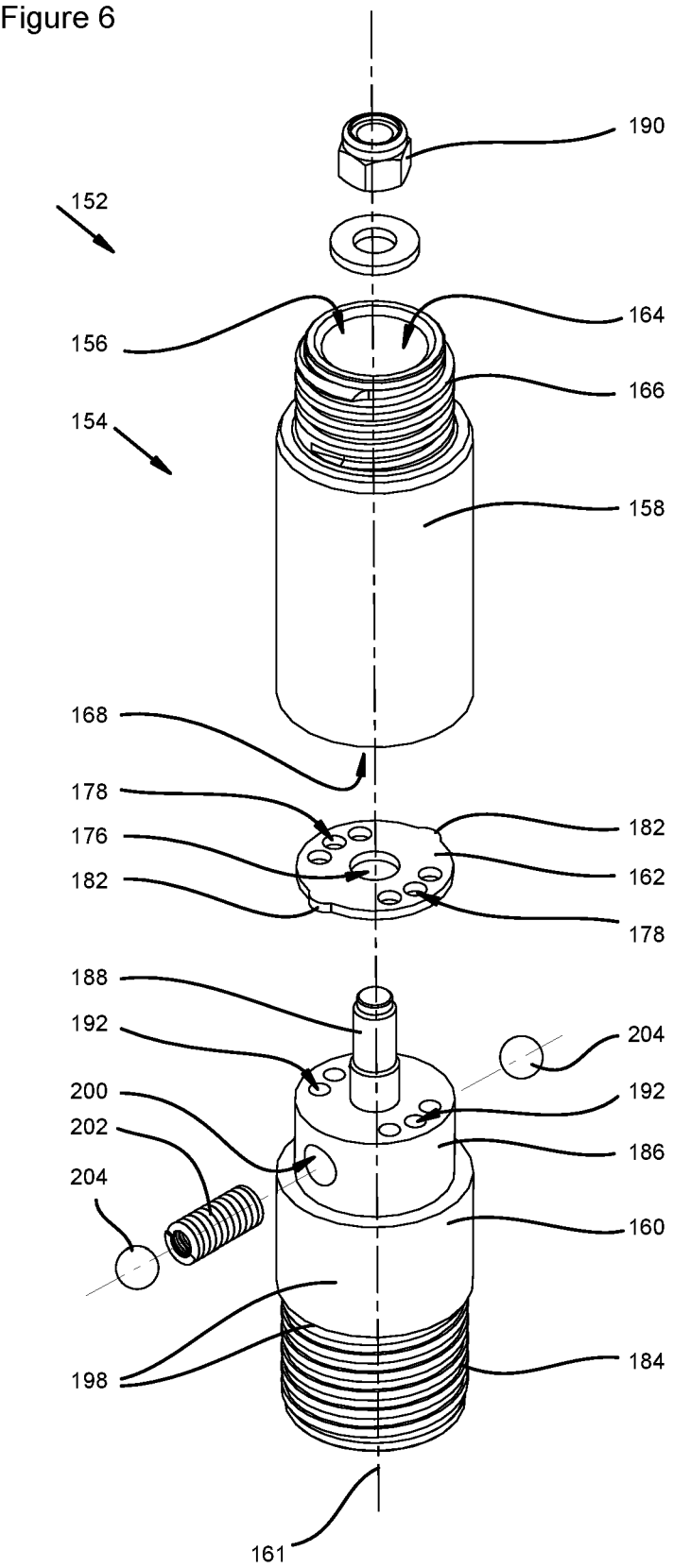
FIG. 6 is an exploded perspective view of the torque transfer and control apparatus seen from its uphole end.

Referring now to FIGS. 5 and 6, the torque transfer apparatus 152 comprises a body 154 having an axial bore 156 therethrough for fluid flow. The body 154 includes a first tubular member 158 being joined to a second tubular member 160 along a common axis 161 so that they are rotatable relative to each other. A friction washer 162 is interposed between the first and second tubular members 158,160 to interconnect the first and second tubular members 158,160.

In the exemplary embodiment the first tubular member 158 is operatively associated with the uphole drill bits 150, while the second tubular member 160 is operatively associated with the downhole drill bit 148. However, it should be appreciated that in other embodiments the torque transfer apparatus 152 will be equally functional if inverted whereby the first tubular member 158 is operatively associated with the downhole drill bit 148 and the second tubular member 160 is operatively associated with the uphole drill bits 150.

An uphole end of the first tubular member 158 has an inlet channel 164 and an external circumferential screw thread 166. The first tubular member 158 has a substantially cylindrical axial socket 168 at its downhole end. A transverse wall 170 traverses the channel 164 partway along the length of the first tubular member 158. A connecting hole 172 extends axially through the transverse wall 170 to permit connection to the second tubular member 160 as will be described in due course. There are also several fluid ports 174 extending through the transverse wall 170 that are configured to permit flow of the drilling fluid. The exemplary embodiment shows the fluid ports 174 being provided in two groups each containing three fluid ports 174 and being concentric about the connecting hole 172. However, it will be appreciated that in other embodiments the fluid ports 174 can be provided as one or more arcuate passages. The groups of fluid ports 174 extend through an arc of less than 90° and are diametrically opposed to each other.

The friction washer 162 is configured to be inserted into the socket 168 and form a snug fit therein. Accordingly, the friction washer 162 has an outer diameter being equivalent to an inner diameter of the socket 168. The friction washer 162 has a central hole 176, with several fluid ports 178 extending through the friction washer 162 concentric to the central hole 176. When the friction washer 162 is located within the socket 168, the fluid ports 178 align with the fluid ports 174 of the first tubular member 158.

Two diametrically opposed recesses or keyways 180 are provided internal of the socket 168, which keyways 180 extend longitudinally from the downhole end of the socket 168 to the transverse wall 170. The friction washer 162 has keys 182 that project radially outwardly and that are shaped congruent to the keyways 180 for being received therein. In the exemplary embodiment the keyways 180 are radially concave in cross-section, while the keys 182 are radially convex. When the friction washer 162 is inserted into the socket 168, the keys 182 engage within the keyways 180 to prevent the friction washer 162 from rotating within the socket 168, thereby ensuring that the fluid ports 178 and fluid ports 174 remain aligned with each other. In another embodiment the friction washer 162 can be held non-rotational by making its central hole 176 non-circular and configured to seat on a complementary shaped non-circular footing of the bolt 188. In yet a further embodiment, the friction washer 162 can have a recess/hole provided in its face abutting the transverse wall 170, which recess/hole is configured to locate over a pin projecting from the transverse wall 170. The skilled addressee will know of many other ways in which the friction washer 162 can be held non-rotational within the socket 168.

The second tubular member 160 has an external circumferential screw thread 184 at its downhole end and a substantially cylindrical axial spigot 186 projecting from its uphole end, wherein the spigot 186 forms a transverse wall traversing the bore 156. The spigot 186 is configured to be rotatably received within the socket 168. A threaded bolt 188 projects axially from the spigot 186 away from the second tubular member 160. The bolt 188 is configured to extend through both the central hole 176 of the washer and the connecting hole 172 of the first tubular member 158 and then be secured by a washer and nut 190 to rotationally join the first and second tubular members 158,160. The first tubular member 158 is axially adjustable relative to the second tubular member 160 due to being movable along the bolt 188 depending on the degree to which the nut 190 is tightened.

Figure 9:
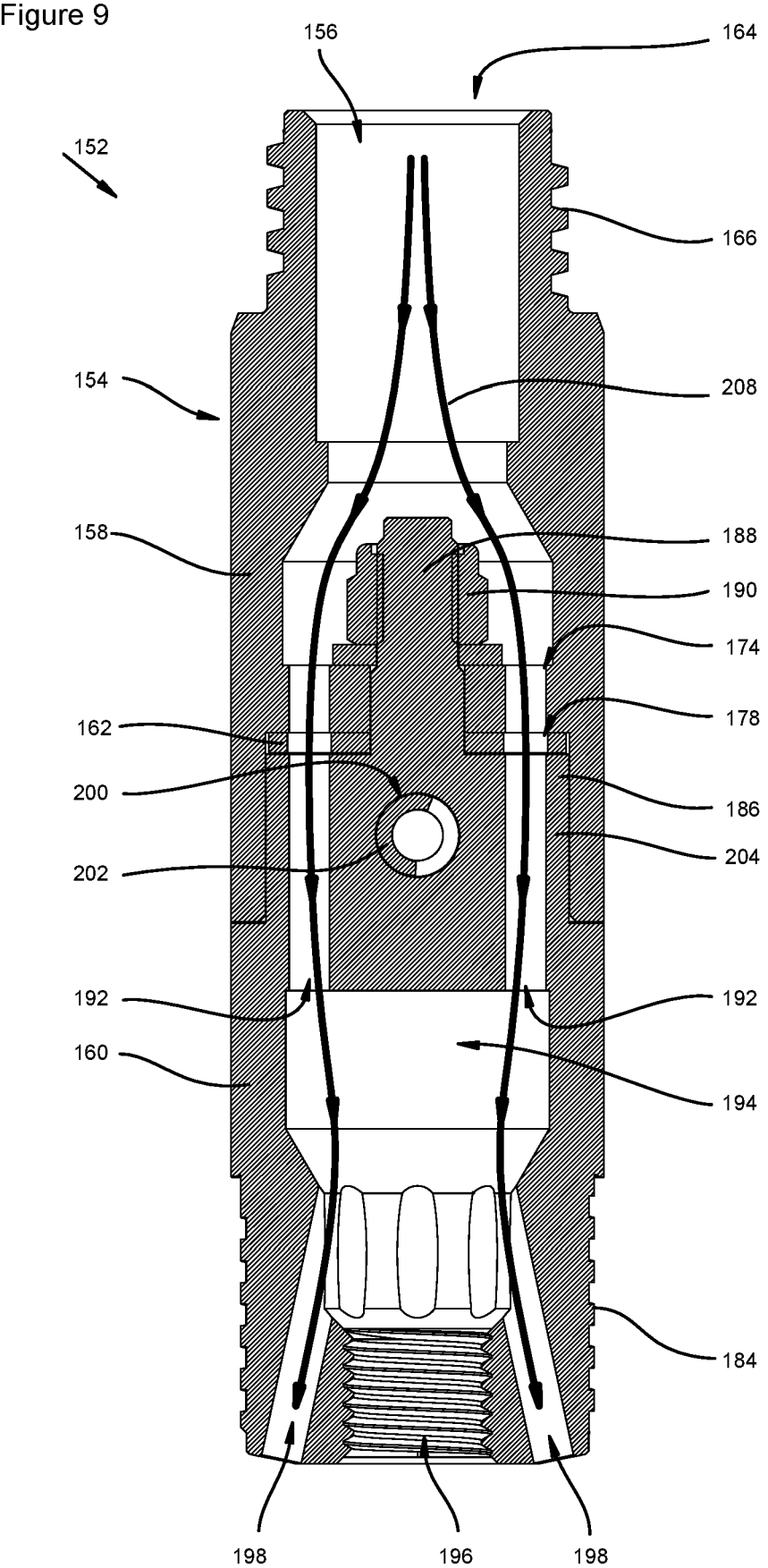
FIG. 9 is a sectional side view orthogonal to that of FIG. 8 showing the open fluid flow path.

Several fluid ports 192 extend through the spigot 186 and are concentric to the bolt 188. The fluid ports 192 are arranged to be selectively aligned with the respective fluid ports 174,178 of the first tubular member 158 and the friction washer 162 thereby to permit fluid flow through the bore 156. The fluid ports 192 open into a chamber 194 (see FIG. 9) within the second tubular member 160. A central threaded connecting channel 196 leads from the chamber 194 to the downhole end of the second tubular member 160.

In some embodiments the connecting channel 196 does not extend into the chamber 194 but is merely in the form of a threaded connecting socket open to the downhole end of the second tubular member 160. There are also several outlet ports 198 leading from the chamber 194 to the downhole end of the second tubular member 160. The outlet ports 198 are substantially equidistantly spaced around the connecting channel 196. In use, for example when the core barrel assembly 144 is attached to the drilling tool 114, an outer tube of the core barrel assembly 144 is joined to the thread 184 and an inner core tube of the core barrel assembly 144 is joined to the connecting channel 196. The outlet ports 198 are configured to open into an annulus between the outer tube and the inner core tube of the core barrel assembly 144. During use, the drilling fluid will exit the chamber 194 through the outlet ports 198 and be directed to flow internally through the core barrel assembly 144, i.e. in the annulus between the outer tube and the inner core tube of the core barrel assembly 144 but not within the inner core tube.

The bore 156 is defined by the cooperation and selective alignment of the inlet channel 164, respective fluid ports 174,178,192, chamber 194 and outlet ports 198 being brought into fluid flow communication with each other.

The spigot 186 further has a through hole 200 extending transversally therethrough. The through hole 200 is orientated perpendicular to the rotational axis of the second tubular member 160 and extends along a diameter of the spigot 186. The through hole 200 is configured to receive a resilient device being configured to outwardly bias one or more movable engagement members. In the exemplary embodiment the resilient device is a spring 202 and the movable engagement members are two spherical balls 204 that are located at either end of the spring 202. The spring 202 is a compression spring being configured to resiliently bias the balls 204 radially outwardly out of the through hole 200. In the exemplary embodiment the spring 202 is a coil spring, but the resilient device can be any other type of biasing member, e.g. a small pneumatic or hydraulic cylinder, elastic plastics or memory foam. The balls 204 have a radius being equivalent to the radius of the keyways 180 so that, when the torque transfer apparatus 152 is assembled, the spring 202 pushes the balls 204 outwardly to snugly engage within the keyways 180. In this way the balls 204 form latching members configured to rotationally couple the first and second tubular members 158,160.

In the exemplary embodiment both the keys 182 and the balls 204 are configured to engage into the same keyways 180. However, in other embodiments they can each be provided with their own unique keyways so that the keys 182 will engage within locating keyways and the balls 204 will engage within latching keyways.

It will be appreciated that it is not essential that only two balls 204 be present. For example, in other embodiments the spigot 186 can have a closed recess containing the spring 202 with only a single ball 204 being outwardly biased therefrom. Alternatively, the spigot 186 can have three or more recesses each housing its own spring 202 and ball 204 being outwardly biased therefrom. In each case the balls 204 are to be selectively engaged within corresponding keyways.

It is envisaged that the balls 204 will extend into the keyways 180 to a depth of between 5% to 45% of the diameter of the balls 204. In some instances the balls 204 will extend into the keyways 180 to a depth of 5%, 10%, 15%, 20%, 25%, 30%, 35%, 40% or 45% of the diameter of the balls 204.

The friction washer 162 and the engagement of the balls 204 within the keyways 180 can individually or cooperatively define a torque limiting device interconnecting the first tubular member 158 and the second tubular member 160. In normal operation when a difference in torque levels applied to the first tubular member 158 and the second tubular member 160 is below a threshold torque value, the torque limiting device rotationally couples the first and second tubular members 158,160 so that torque is transferred between them. However, when the difference in torque levels applied to the first tubular member 158 and the second tubular member 160 exceeds the threshold torque value the torque limiting device at least partially and/or temporarily disengages the rotational coupling between the first and second tubular members 158,160. The rotational coupling between the first and second tubular members 158,160 remains at least partially disengaged while the difference in torque levels exceeds the threshold torque value, whereas the rotational coupling can be reengaged after the difference in torque levels again falls below the threshold torque value.

In one embodiment of the torque limiting device, the threshold torque value is dependent on the friction experienced between the friction washer 162 and the spigot 186. Tightening the nut 190 causes the first and second tubular members 158,160 to move closer together thereby increasing the pressure on the friction washer 162 and increasing the friction between the friction washer 162 and the spigot 186, accordingly thereby increasing the threshold torque value. Conversely, loosening the nut 190 allows the first and second tubular members 158,160 to move further apart, reducing the pressure on the friction washer 162 and the friction between the friction washer 162 and the spigot 186, thereby reducing the threshold torque value.

The level of friction between the friction washer 162 and the spigot 186 will typically be dependent on the specific material of which the friction washer 162 is made.

In another embodiment of the torque limiting device, the threshold torque value is dependent on the force required to disengage the balls 204 from the keyways 180. Thus, increasing the outward biasing force exerted by the spring 202 increases the threshold torque value and, conversely, decreasing the outward biasing force exerted by the spring 202 decreases the threshold torque value. One method of adjusting the biasing force is to replace the type of spring 202 with a stronger or weaker spring. It should be further understood that the force required to disengage the balls 204 from the keyways 180 is also dependent on the depth of the keyways 180 and the volume/radial portion of the balls 204 that is engaged within the keyways 180, i.e. how big of a "step" must the balls 204 take to step out of the keyways 180. In some embodiments the torque transfer apparatus 152 can include an adjustment mechanism to adjust the extent to which the balls 204 can project outwardly of the spigot 186 or the extent to which the balls 204 can engage within the keyways 180. For example, a grub screw (not shown) can be provided to screw through the spigot 186 into the through hole 200 to limit or adjust the extent to which the balls 204 can project outwardly beyond the spigot 186. Alternatively, a grub screw (not shown) can be provided to screw through the first tubular member 158 into the keyways 180 to limit or adjust the extent to which the balls 204 can engage into the keyways 180. Yet further, the torque transfer apparatus 152 may include a cylindrical sleeve (not shown) to be located within the socket 168 and surround the spigot 186, which sleeve comprises a cam along which the balls 204 run and which sleeve provides keyways 180 of selective depths—interchanging such sleeves allows adjustment of the extent to which the balls 204 can engage into the keyways 180.

The operation of the torque transfer apparatus 152 will now be described with reference to FIGS. 7 to 12.

Figure 7:
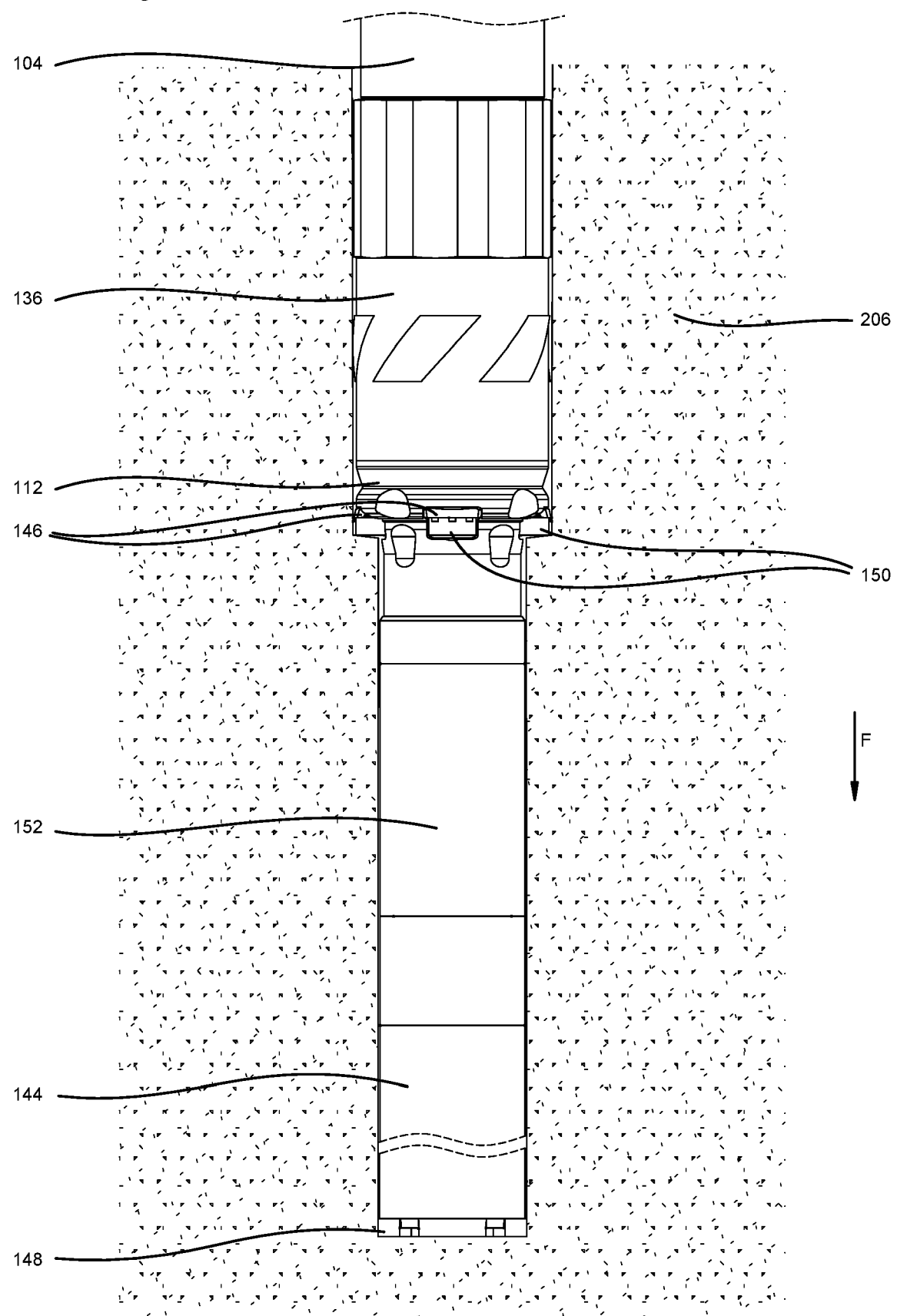
FIG. 7 shows the drill string and drilling tool of FIG. 2 drilling through a competent rock formation, that may be uniform.

As drilling commences, force is applied downhole in direction F from the drill rig 100. In competent rock formations 206 (as shown in FIG. 7), where the rock formation is of the same integrity and rock type throughout, then an optimal downhole force is applied to both the first and second cutting interface, i.e. to both the downhole drill bit 148 and the uphole drill bits 150, such that the torque difference between torque on the first member and torque on the second member is or remains below a threshold torque value.

Figure 8:
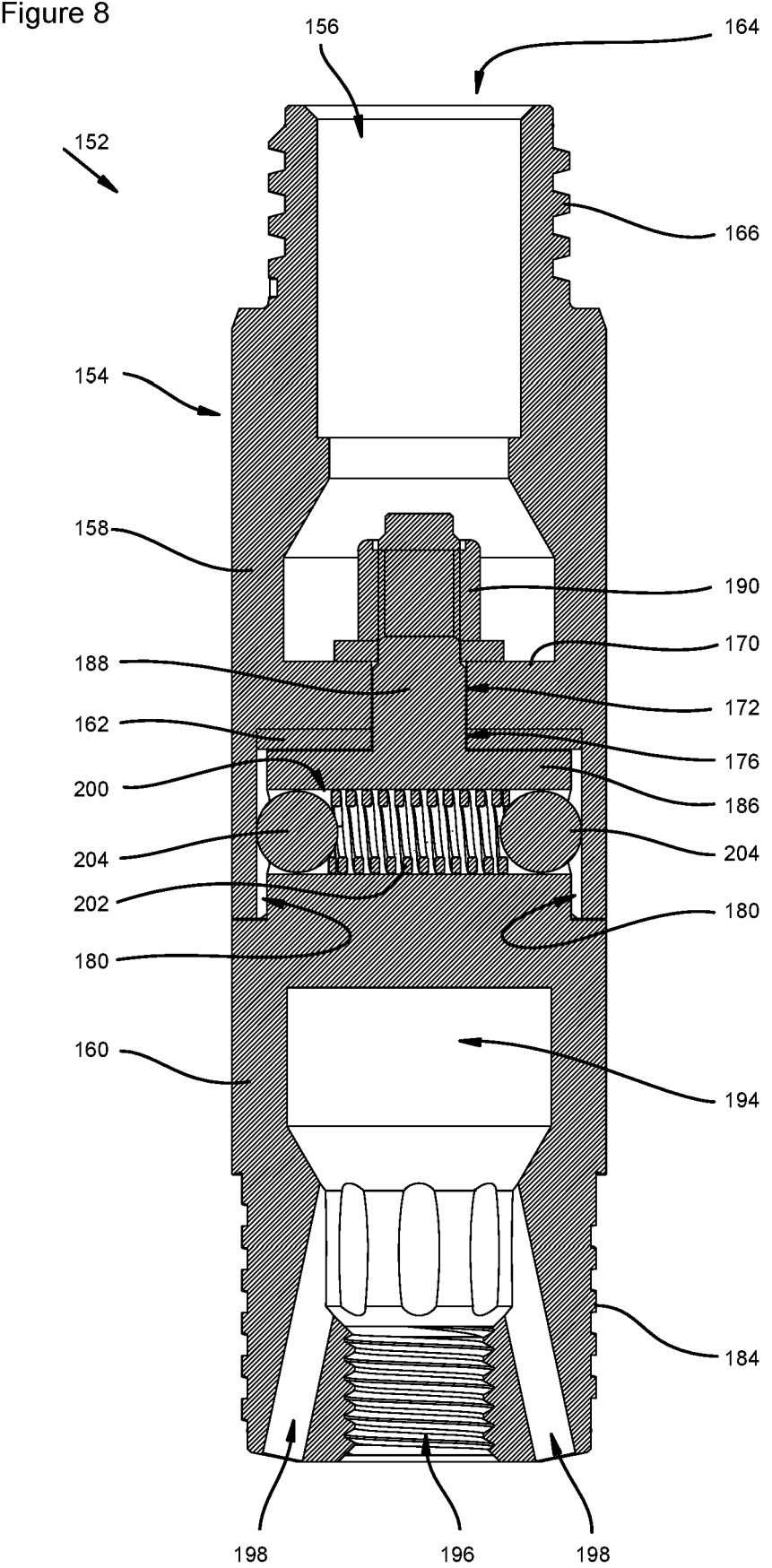
FIG. 8 is a sectional side view of the torque transfer and control apparatus shown in a rotationally coupled position with an open fluid flow path permitting fluid flow therethrough.

When drilling under these favourable conditions, the first and second tubular members 158,160 remain rotationally coupled, whereby the balls 204 project proud of the spigot 186 and are engaged within the keyways 180 (shown in FIG. 8). When in this position the fluid ports 174,178,192 are all aligned and in fluid flow communication with each other (shown in FIG. 9) so that a full flow rate of the drilling fluid is able to flow from the drill string 104, through the bore 156 of the torque transfer apparatus 152 and out through the outlet ports 198 to the downhole drill bit 148. The open fluid flow path for the drilling fluid is indicated by reference numeral 208. This open fluid flow path will be observable to a driller looking at the sensors 122 as a substantially constant downhole fluid pressure.

Figure 10:
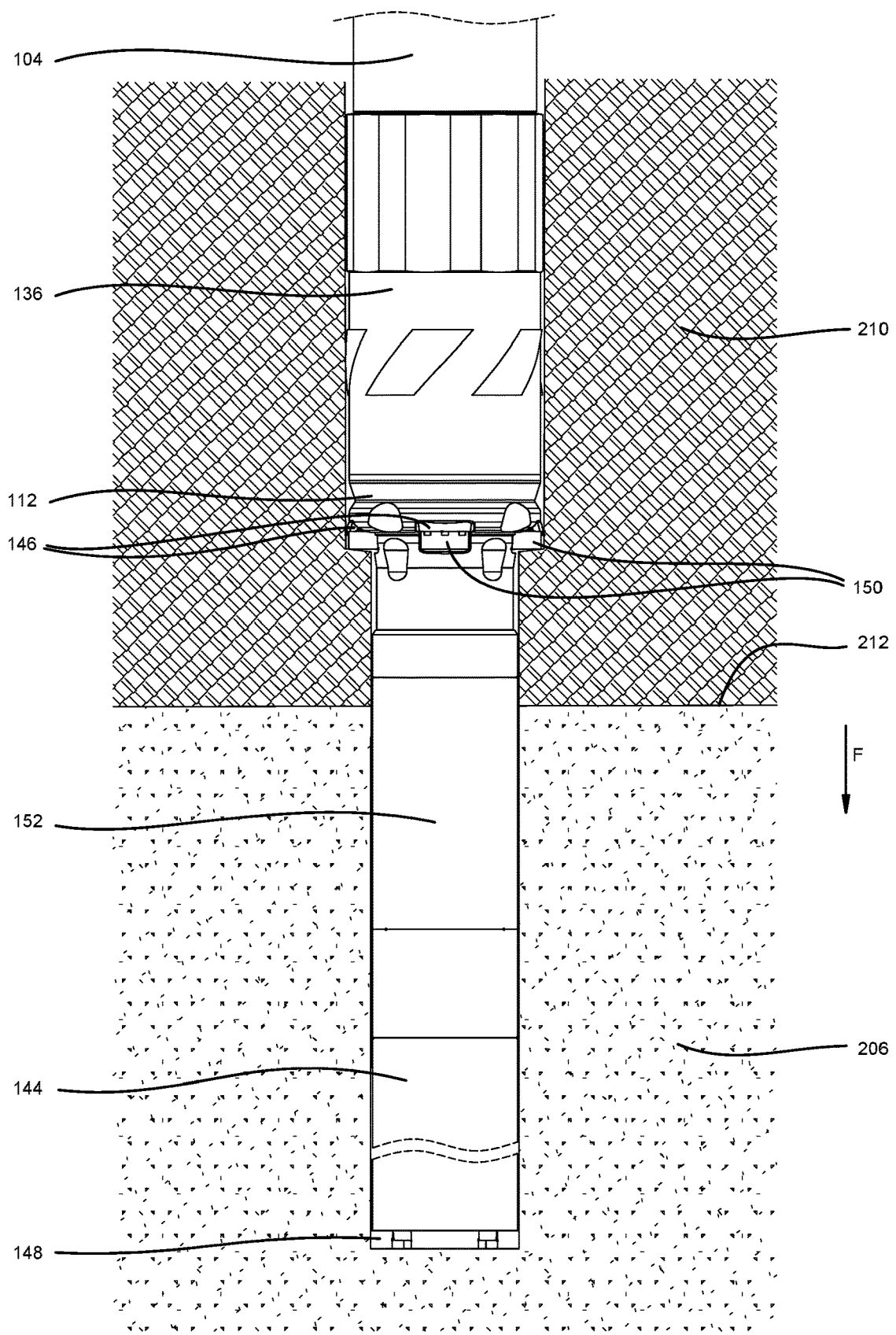
FIG. 10 shows the drilling string and drilling tool of FIG. 2 drilling through a boundary between an incompetent rock formation and a competent rock formation.
Figure 11:
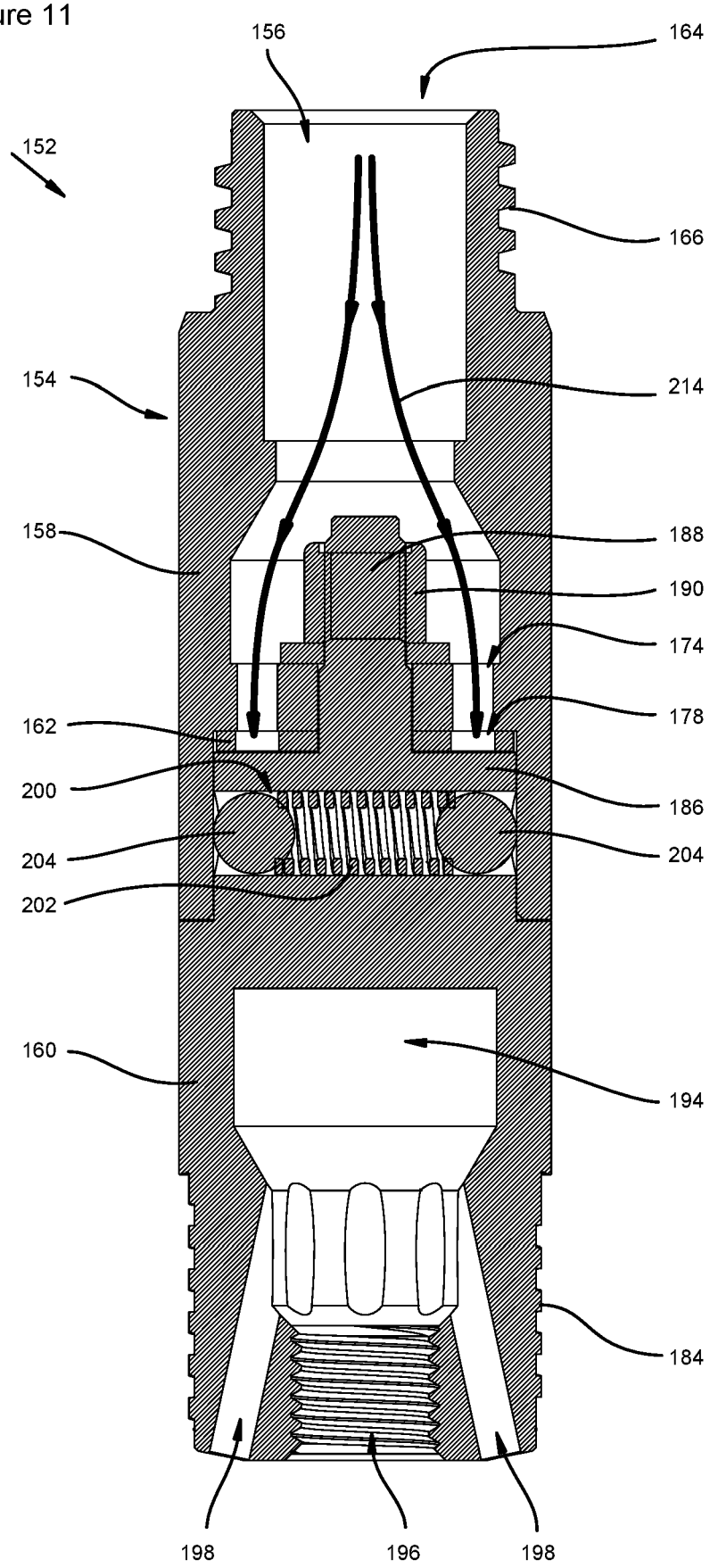
FIG. 11 is a sectional side view of the torque transfer and control apparatus shown in a rotationally decoupled position with a closed fluid flow path blocking fluid flow therethrough.
Figure 12:
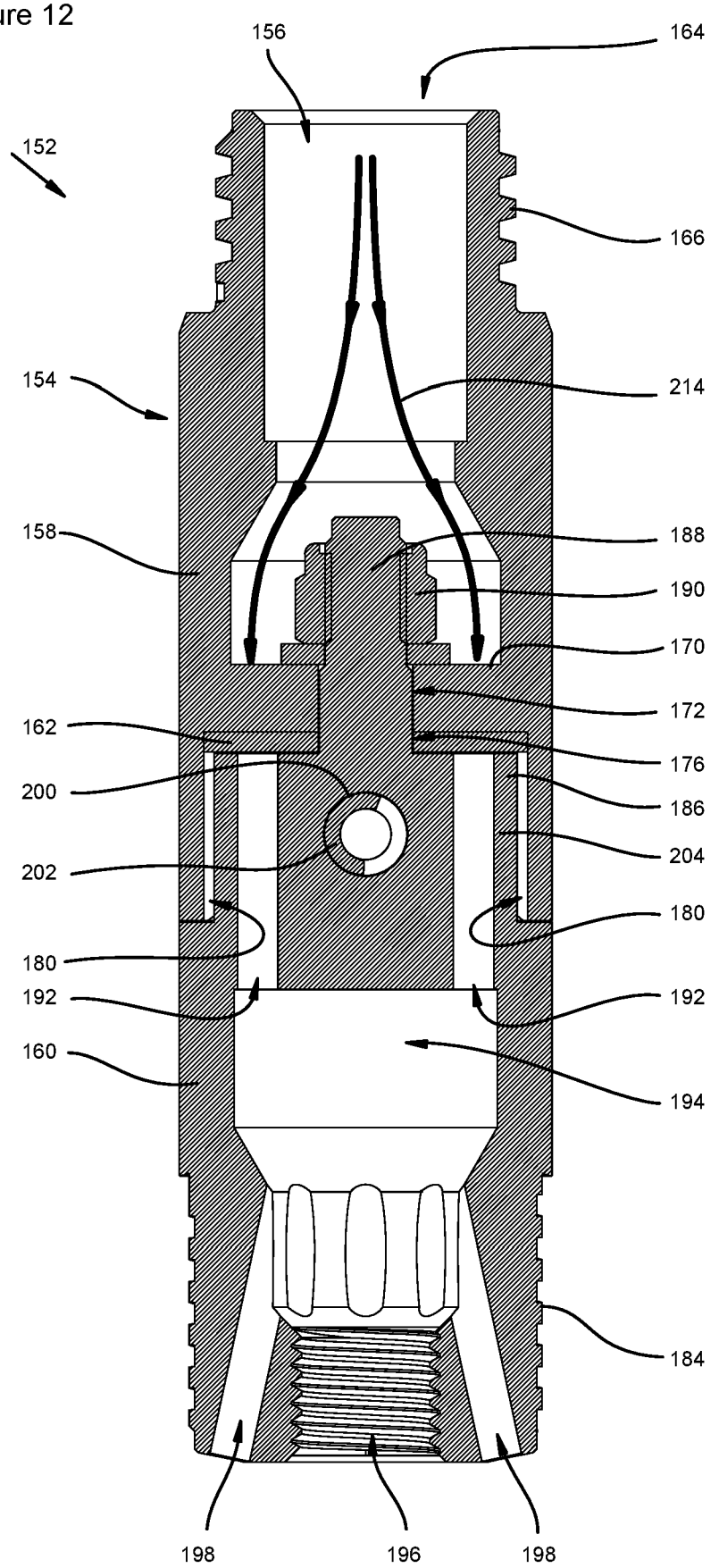
FIG. 12 is a sectional side view orthogonal to that of FIG. 11 showing the closed fluid flow path.

However, when drilling in incompetent rock formations 210, where the integrity of the rock formation is variable and contains areas of weakness or voids, or when the drilling tool 114 traverses a boundary 212 between different competent rock layers (as shown in FIG. 10), then uncontrolled transfer of the downhole force F will normally be experienced between the first and second cutting interfaces such that the load and torque resistance is no longer optimal. It will be appreciated that these changes can occur frequently and at unknown intervals when drilling exploration boreholes. Also, as many boreholes are quite deep, often being 500 m-2000 m or more in depth, there is a significant delay in downhole drilling conditions being relayed to a driller on the surface. The driller therefore has a limited ability to react timeously to such rock formation changes. Accordingly, in such situations the uphole drill bits 150 may no longer carry a sufficient share of the weight on bit and this results in an undesirably high portion of the downhole force F being exerted onto the downhole drill bit 148. If the weight on bit is not regulated quickly, this can lead to damage to the drilling tool 114, including galling and belling of the threads, as well as metal fatigue or break down of the drilling tool 114 itself, catastrophic failure of the downhole drill bit 148 and/or polishing of the downhole drill bit 148.

When drilling under these adverse conditions, the torque experienced by the downhole drill bit 148 will differ from the torque experienced by the uphole drill bits 150. If the downhole force F is low enough, the torque difference will remain below the threshold torque value and the first and second tubular members 158,160 will remain rotationally coupled so that normal drilling can proceed. However, if the downhole force F is sufficiently high, the torque difference will exceed the threshold torque value, resulting in the rotational coupling between the first and second tubular members 158,160 becoming partially or temporarily disengaged. In this situation the force transferred from the first tubular member 158 through the balls 204 will overcome the bias of the spring 202 causing the spring 202 to compress and the balls 204 to step out of the keyways 180 (FIGS. 11 and 12) allowing the first tubular member 158 to rotate relative to the second tubular member 160. After the first tubular member 158 has rotated through 180°, the balls 204 will respectively re-engage into the opposed keyways 180, thereby temporarily re-engaging concurrent rotation of the first and second tubular members 158,160. If the torque difference still exceeds the threshold torque value, the balls 204 will again step out of the keyways 180 so that the first tubular member 158 can rotate through a further 180° relative to the second tubular member 160. This stepwise discrete rotation of the first tubular member 158 will continue indefinitely until the downhole force F applied by the drill rig 100 is reduced by an operator to be low enough such that the torque difference again falls below the threshold torque value, at which stage the balls 204 will no longer step out of the keyways 180, thereby causing the first and second tubular members 158,160 to remain rotationally engaged so that normal drilling can again proceed.

In this way the torque transfer apparatus 152 provides an almost instantaneous reaction to the uncontrolled transfer of the downhole force F between the first and second cutting interfaces where the load and torque resistance is no longer optimal.

While the first tubular member 158 is rotating relative to the second tubular member 160, and as the balls 204 step out of the keyways 180, the fluid ports 174,178 will become misaligned with the fluid ports 192. In the exemplary embodiment, after the first tubular member 158 has rotated through about 1° to 45°, the bore 156 will be at least partially blocked, thus also partially blocking the fluid flow path 208, causing the drilling fluid to experience a restricted flow rate through the bore 156. As the first tubular member 158 rotates further, through about 45° to 135°, the bore 156 will become fully blocked so that the drilling fluid is unable to flow through the bore 156 (shown in FIGS. 11 and 12). The blocked fluid flow path of the drilling fluid is indicated by reference numeral 214. Then as the first tubular member 158 rotates further, through about 135° to 179°, the bore 156 will become increasingly unblocked so that the drilling fluid is again able to experiences a restricted flow rate through the bore 156. Finally, after the first tubular member 158 has rotated through 180°, i.e. when the balls 204 re-engage the keyways 180, the bore 156 will become fully open so that the drilling fluid is again able to flow unrestricted.

It will be appreciated that in other embodiments of the torque transfer apparatus 152, the positions and/or shapes of the fluid ports 174,178,192 can differ, thereby resulting in the opening or partial restriction or blocking of the bore 156 occurring at different rotational angles.

This restricted and blocked flow of drilling fluid continues while the torque difference exceeds the threshold torque value and this is relayed back uphole as a pressure increase and/or pulse feedback through the drilling fluid. The driller, on noticing the pressure pulse feedback on the sensors 122, will be alerted to the change in downhole conditions (e.g. a change in rock formation competency) and should then make appropriate decisions in relation to the operation of the drill rig 100. During the decision-making process the torque transfer apparatus 152 continues operating to reduce the torque being experienced by the downhole drill bit 148. Typically, the driller will adjust the drilling parameters acting downhole, e.g. by decreasing the downhole force F allowing the first tubular member 158 to re-engage with the second tubular member 160 so that drilling can continue. The driller will note the re-engagement by the elimination of the pressure increase and/or pulse feedback. After a suitable time, once the driller believes the drilling tool 114 has past beyond the incompetent rock formation, the driller can again increase the downhole force F.

It will be appreciated by persons skilled in the art that numerous variations and/or modifications may be made to the torque transfer and control apparatus as shown in the specific embodiments without departing from the spirit or scope of the disclosure as broadly described. The present embodiments are, therefore, to be considered in all respects as illustrative and not restrictive.

For example, by adjusting the location of the fluid ports 174,178,192 so that at least some of the ports always remain aligned, it will be possible to prevent totally blocking the bore 156. In this manner at least some drilling fluid will continuously flow through to the downhole drill bit 148 and thereby prevent potential seizure or burnout of the downhole drill bit 148.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the rock bolt.

| | Reference numerals |
|---|---|
| 100 | drill rig |
| 102 | borehole |
| 104 | drill string |
| 106 | mast |
| 108 | rotation head |
| 110 | drill rods |
| 112 | drive sub |
| 114 | drilling tool |
| 116 | wireline |
| 118 | winch |
| 120 | mud pit |
| 122 | sensors |
| 124 | passage |
| 126 | guide edge |
| 128 | peak |
| 130 | socket |
| 132 | key |
| 134 | thread |
| 136 | reamer sub |
| 138 | lugs |
| 140 | slots |
| 142 | spear point |
| 144 | core barrel assembly |
| 146 | coupling members |
| 148 | downhole drill bit |
| 150 | uphole drill bit |
| 152 | torque transfer apparatus |
| 154 | body |
| 156 | bore |
| 158 | first tubular member |
| 160 | second tubular member |
| 161 | rotational axis |
| 162 | friction washer |
| 164 | inlet channel |
| 166 | thread (first tubular member) |
| 168 | socket |
| 170 | transverse wall |
| 172 | connecting hole |
| 174 | fluid ports (first tubular member) |
| 176 | central hole |
| 178 | fluid ports (friction washer) |
| 180 | keyways |
| 182 | keys |
| 184 | thread (second tubular member) |
| 186 | spigot |
| 188 | bolt |
| 190 | nut |
| 192 | fluid ports (second tubular member) |

-continued

| | Reference numerals |
|---|---|
| 194 | chamber |
| 196 | connecting channel |
| 198 | outlet ports |
| 200 | through hole |
| 202 | spring |
| 204 | balls |
| 206 | competent rock formation |
| 208 | open flow path |
| 210 | incompetent rock formation |
| 212 | boundary |
| 214 | blocked flow path |

The invention claimed is:

1. A drilling tool for use in a downhole assembly of a drill string used in the mineral drilling industry, the drilling tool comprising:
   a downhole drill bit provided at its downhole end;
   one or more uphole drill bits located uphole of and spaced apart from the downhole drill bit;
   a torque transfer apparatus located between the downhole drill bit and the uphole drill bits, wherein the torque transfer apparatus comprises:
      a body having an axial bore therethrough for fluid flow, the body comprising a first member and a second member being rotatably joined relative to each other, wherein one of the first member and the second member is operatively associated with the downhole drill bit and the other of the first member and the second member is operatively associated with the one or more uphole drill bits;
      a torque limiting device interconnecting the first and second members, wherein the torque limiting device is configured to transfer torque between the first and second members by rotationally coupling the first and second members together when a torque difference between torque on the first member and torque on the second member is below a threshold torque value, and wherein the torque limiting device is configured to at least partially or temporarily disengage the coupling between the first and second members while the torque difference exceeds the threshold torque value; and
      a fluid flow modifier being configured to alter a flow rate of drilling fluid flowing through the axial bore when the torque limiting device engages and disengages the coupling between the first and second members; and
   a plurality of coupling members provided on the drilling tool, the coupling members being able to extend or retract in a radial direction relative to the drilling tool to respectively permit coupling or decoupling of the drilling tool to a drive sub mounted on a drill string, wherein the one or more uphole drill bits are mounted on the coupling members.

2. A drilling tool as claimed in claim 1, wherein the body has a transverse wall traversing the axial bore with one or more fluid ports extending through the transverse wall, and wherein the fluid flow modifier is configured to selectively open or close the fluid ports.

3. A drilling tool as claimed in claim 2, wherein the fluid ports are open while the torque limiting device engages the coupling between the first and second members.

4. A drilling tool as claimed in claim 2, wherein one or more of the fluid ports are selectively able to be at least partially or fully closed while the torque limiting device disengages the coupling between the first and second members.

5. A drilling tool as claimed in claim 2, wherein the fluid flow modifier is configured to cause an increased or pulsing pressure change in the drilling fluid flowing within the axial bore.

6. A drilling tool as claimed in claim 1, wherein the torque limiting device comprises a friction washer interposed between the first member and the second member.

7. A drilling tool as claimed in claim 6, wherein the friction washer is non-rotatable relative to the first member.

8. A drilling tool as claimed in claim 7, wherein the friction washer comprises at least one key projecting radially outwardly therefrom, each key being receivable in a corresponding locating keyway provided on the first member.

9. A drilling tool as claimed in claim 6, wherein the threshold torque value is adjustable by varying the friction between the friction washer and the second member.

10. A drilling tool as claimed in claim 9, wherein the first member is axially adjustable relative to the second member thereby being configured to selectively increase or decrease a pressure exerted on the friction washer and thereby alter the friction between the friction washer and the second member.

11. A drilling tool as claimed in claim 1, wherein the torque limiting device comprises the first member having a first surface defining at least one recess therein and the second member having at least one movable engagement member, each engagement member being biased by a resilient device to partially engage into the recess on the first member to cause the first and second members to rotate together, and wherein the engagement member is configured to disengage from the recess when the torque difference exceeds the threshold torque value.

12. A drilling tool as claimed in claim 11, wherein the threshold torque value is adjustable by varying a biasing force exerted by the resilient device.

13. A drilling tool as claimed in claim 11, wherein the threshold torque value is adjustable by varying a depth to which each engagement member extends into its recess.

14. A drilling tool as claimed in claim 1, wherein the fluid flow modifier is configured to reduce the flow rate of fluid flowing through the axial bore when the torque limiting device disengages the coupling between the first and second members.

15. A drilling tool as claimed in claim 1, wherein the uphole drill bits comprise one or more reamers, cutters or hole openers.

16. A drilling tool as claimed in claim 1, wherein the downhole drill bit is mounted on a core barrel assembly carried by the drilling tool.

17. A drilling tool as claimed in claim 16, wherein the torque transfer apparatus comprises one or more outlet ports leading from the axial bore, with each outlet port being configured to open into an annulus between an outer tube and an inner core tube of the core barrel assembly.

18. A method of operating a drilling tool that has a downhole drill bit and an axially spaced apart uphole drill bit, the method comprising the steps of:

providing a drilling tool comprising:
   a downhole drill bit provided at its downhole end;
   one or more uphole drill bits located uphole of and spaced apart from the downhole drill bit;
   a torque transfer apparatus located between the downhole drill bit and the uphole drill bits, wherein the torque transfer apparatus comprises:
      a body having an axial bore therethrough for fluid flow, the body comprising a first member and a second member being rotatably joined relative to each other, wherein one of the first member and the second member is operatively associated with the downhole drill bit and the other of the first member and the second member is operatively associated with the one or more uphole drill bits;
      a torque limiting device interconnecting the first and second members, wherein the torque limiting device is configured to transfer torque between the first and second members by rotationally coupling the first and second members together when a torque difference between torque on the first member and torque on the second member is below a threshold torque value, and wherein the torque limiting device is configured to at least partially or temporarily disengage the coupling between the first and second members while the torque difference exceeds the threshold torque value; and
      a fluid flow modifier being configured to alter a flow rate of drilling fluid flowing through the axial bore when the torque limiting device engages and disengages the coupling between the first and second members; and
   a plurality of coupling members provided on the drilling tool, the coupling members being able to extend or retract in a radial direction relative to the drilling tool to respectively permit coupling or decoupling of the drilling tool to a drive sub mounted on a drill string, wherein the one or more uphole drill bits are mounted on the coupling members;

operating the drilling tool in a borehole to rotate the drilling tool so that, while a torque difference between torque on the downhole drill bit and torque on the uphole drill bit is below a threshold torque value, torque applied to the drilling tool is applied to the downhole drill bit and the uphole drill bit;

having drilling fluid flow at a selected flow rate through the torque transfer apparatus;

allowing the torque transfer apparatus to at least partially or temporarily disengage the coupling between the downhole drill bit and the uphole drill bit while the torque difference exceeds the threshold torque value;

causing the drilling fluid to flow at an altered flow rate through the torque transfer apparatus when the torque transfer apparatus disengages the coupling between the downhole drill bit and the uphole drill bit; and if the torque difference subsequently drops below the threshold torque value, automatically re-engaging the rotational coupling between the downhole drill bit and the uphole drill bit and causing the drilling fluid to flow at the selected flow rate.

\* \* \* \* \*